United States Patent
Endo et al.

(10) Patent No.: US 12,105,895 B2
(45) Date of Patent: Oct. 1, 2024

(54) OPERATING DEVICE USING VARIABLE RESISTOR

(71) Applicant: ALPS ALPINE CO., LTD., Tokyo (JP)

(72) Inventors: Tomoya Endo, Miyagi (JP); Kazuhiko Sasaki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 66 days.

(21) Appl. No.: 17/930,099

(22) Filed: Sep. 7, 2022

(65) Prior Publication Data

US 2023/0004235 A1 Jan. 5, 2023

Related U.S. Application Data

(63) Continuation of application No. PCT/JP2021/009641, filed on Mar. 10, 2021.

(30) Foreign Application Priority Data

Mar. 16, 2020 (JP) .................... 2020-045117

(51) Int. Cl.
*H01H 25/04* (2006.01)
*A63F 13/24* (2014.01)
(Continued)

(52) U.S. Cl.
CPC ............ *G06F 3/0338* (2013.01); *A63F 13/24* (2014.09); *G05G 1/015* (2013.01); *G05G 1/04* (2013.01);
(Continued)

(58) Field of Classification Search
CPC .. G05G 1/015; G05G 1/04; G05G 2009/0474; G05G 9/047; G05G 2009/04751; G06F 3/0338; H01H 25/04
See application file for complete search history.

(56) References Cited

U.S. PATENT DOCUMENTS 4,864,272 A * 9/1989 Cecchi .................. H01C 10/16
338/128
6,538,639 B1 3/2003 Takahashi
(Continued)

FOREIGN PATENT DOCUMENTS

| JP | S56-038407 U | 4/1981 |
| JP | 2001-022462 | 1/2001 |

(Continued)

OTHER PUBLICATIONS

International Search Report for PCT/JP2021/009641 mailed on May 25, 2021.

*Primary Examiner* — Charles A Fox
*Assistant Examiner* — Gregory T Prather
(74) *Attorney, Agent, or Firm* — IPUSA, PLLC

(57) ABSTRACT

An operating device has: a lever configured to be operated by tilting; a resistor having a flat strip shape and provided on a surface of a substrate; and a slider configured to change an output voltage value by sliding on a surface of the resistor in accordance with tilting operation of the lever. In this operating device, the resistor has a low-resistance portion that has a lower resistance value than other portions of the resistor, and that is a portion in contact with the slider when the lever is in a neutral position.

3 Claims, 9 Drawing Sheets

(51) Int. Cl.
*G05G 1/015* (2008.04)
*G05G 1/04* (2006.01)
*G05G 9/047* (2006.01)
*G06F 3/0338* (2013.01)

(52) U.S. Cl.
CPC ............. *H01H 25/04* (2013.01); *G05G 9/047* (2013.01); *G05G 2009/0474* (2013.01)

(56) References Cited

U.S. PATENT DOCUMENTS

| | | | |
|---|---|---|---|
| 2004/0129695 A1* | 7/2004 | He | G05D 23/2401 |
| | | | 219/504 |
| 2009/0025378 A1* | 1/2009 | Laumer | B65F 3/06 |
| | | | 60/395 |
| 2020/0097037 A1* | 3/2020 | Asano | H01H 25/04 |

FOREIGN PATENT DOCUMENTS

| | | |
|---|---|---|
| JP | 2009-009799 | 1/2009 |
| JP | 2014-002595 | 1/2014 |
| JP | 2019-160457 | 9/2019 |

\* cited by examiner

OPERATING DEVICE USING VARIABLE RESISTOR

CROSS-REFERENCE TO RELATED APPLICATION

This application is a continuation application of International Application No. PCT/JP2021/009641, filed on Mar. 10, 2021, and designated the U.S., which is based upon and claims priority to Japanese Patent Application No. 2020-045117, filed on Mar. 16, 2020, the entire contents of which are incorporated herein by reference.

BACKGROUND OF THE INVENTION

1. Field of the Invention

The present invention relates to an operating device.

2. Description of the Related Art

Conventionally, a technique for detecting the tilt of a lever by using a variable resistor is used for an operating device that is used as a gaming machine's controller or the like. With such an operating device, cases might occur in which, when the lever tries to return to its neutral position, the lever's return fails physically (that is, the lever is unable to resume its neutral position completely).

In relationship to this, Patent Document 1 below relates to an operating device that detects the tilt of an operating shaft by using a variable resistor. Patent Document 1 discloses a technique for making the slope of variation of output in the neutral position region more moderate than the slope of variation of output outside the neutral position region by means of processing using an analog amplifier circuit or a digital circuit. This technique generally assumes that the apparent precision of the lever's return can be improved.

RELATED-ART DOCUMENT

Patent Document

[Patent Document 1] Unexamined Japanese Patent Application Publication No. 2014-2595

SUMMARY OF THE INVENTION

Technical Problem

Now, there is a conventional operating device that is known for using a resistor and a slider as a variable resistor. In this variable resistor, the flat, strip-shaped resistor is provided on the surface of a substrate, and the slider changes the output voltage value by sliding on the surface of the resistor in accordance with the tilting operation of the lever.

However, when the lever in this conventional operating device using such a variable resistor fails to return to its neutral position physically, it is difficult to improve the accuracy of the lever's return to its neutral position, considering the output voltage values output from the operating device, without relying on signal processing. If the accuracy of return of the lever to its neutral position is low in output voltage values, it is necessary to set the range of the dead band of output voltage values large, which in turn narrows the range of output voltage values that are available for use.

Solution to Problem

An operating device according to one embodiment includes: a lever configured to be operated by tilting; a resistor having a flat strip shape and provided on a surface of a substrate; and a slider configured to change an output voltage value by sliding on a surface of the resistor in accordance with tilting operation of the lever. In this operating device, the resistor has a low-resistance portion that has a lower resistance value than other portions of the resistor, and that is a portion in contact with the slider when the lever is in a neutral position.

Advantageous Effects of the Invention

According to one embodiment, an operating device uses a flat, strip-shaped resistor provided on the surface of a substrate, and a slider, configured to change the output voltage value by sliding on the surface of the resistor in accordance with the tilting operation of the lever, as a variable resistor. With this operating device, it is possible to improve the accuracy with which the lever returns to its neutral position, in the output voltage values output from the operating device, without relying on signal processing.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Now, an embodiment will be described below with reference to the accompanying drawings.

(Overview of Operating Device 100)

Figure 1:
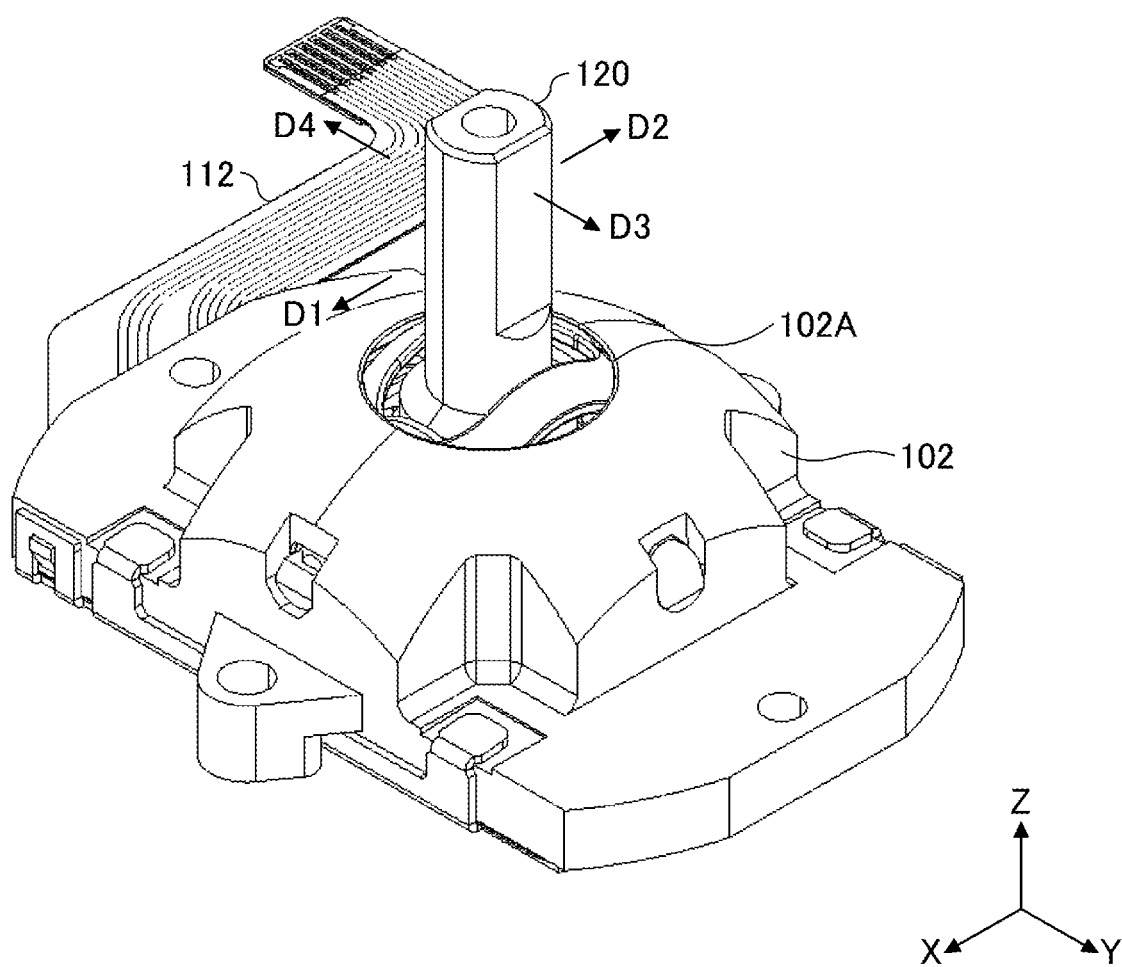
FIG. 1 is an external perspective view of an operating device according to one embodiment.

FIG. 1 is an external perspective view of an operating device 100 according to one embodiment. Note that, in the following description, the direction of the Z-axis in the drawings will be taken as the up-down direction, the direction of the X-axis in the drawings will be taken as the front-rear direction, and the direction of the Y-axis in the drawings will be taken as the left-right direction, for ease of explanation.

The operating device 100 shown in FIG. 1 is used as a gaming machine's controller or the like. As shown in FIG.

1, the operating device 100 has a columnar lever 120 that extends upward from an opening portion 102A of the case 102, and this lever 120 can be tilted and operated. With this operating device 100, the lever 120 can be operated by tilting not only in the front-rear direction (arrows D1 and D2 in the drawing) and the left-right direction (arrows D3 and D4 in the drawing), but also in all directions between these directions. Furthermore, the operating device 100 can output operation signals in accordance with the tilting operation (tilting direction and tilting angle) of the lever 120 to the outside via an FPC (Flexible Printed Circuits) 112.

(Configuration of Operating Device 100)

Figure 2:
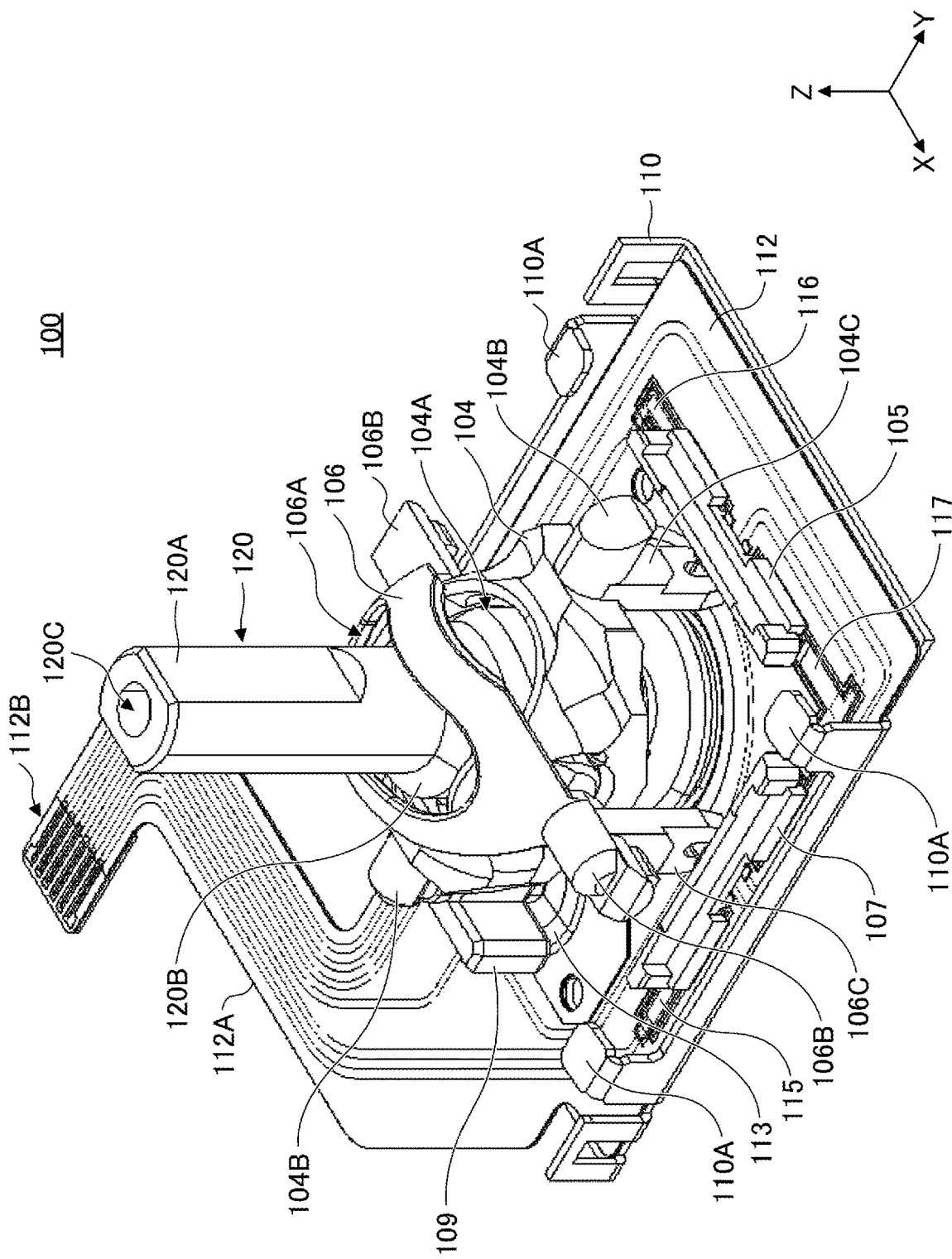
FIG. 2 is an external perspective view of the operating device (with the case removed) according to one embodiment.
Figure 3:
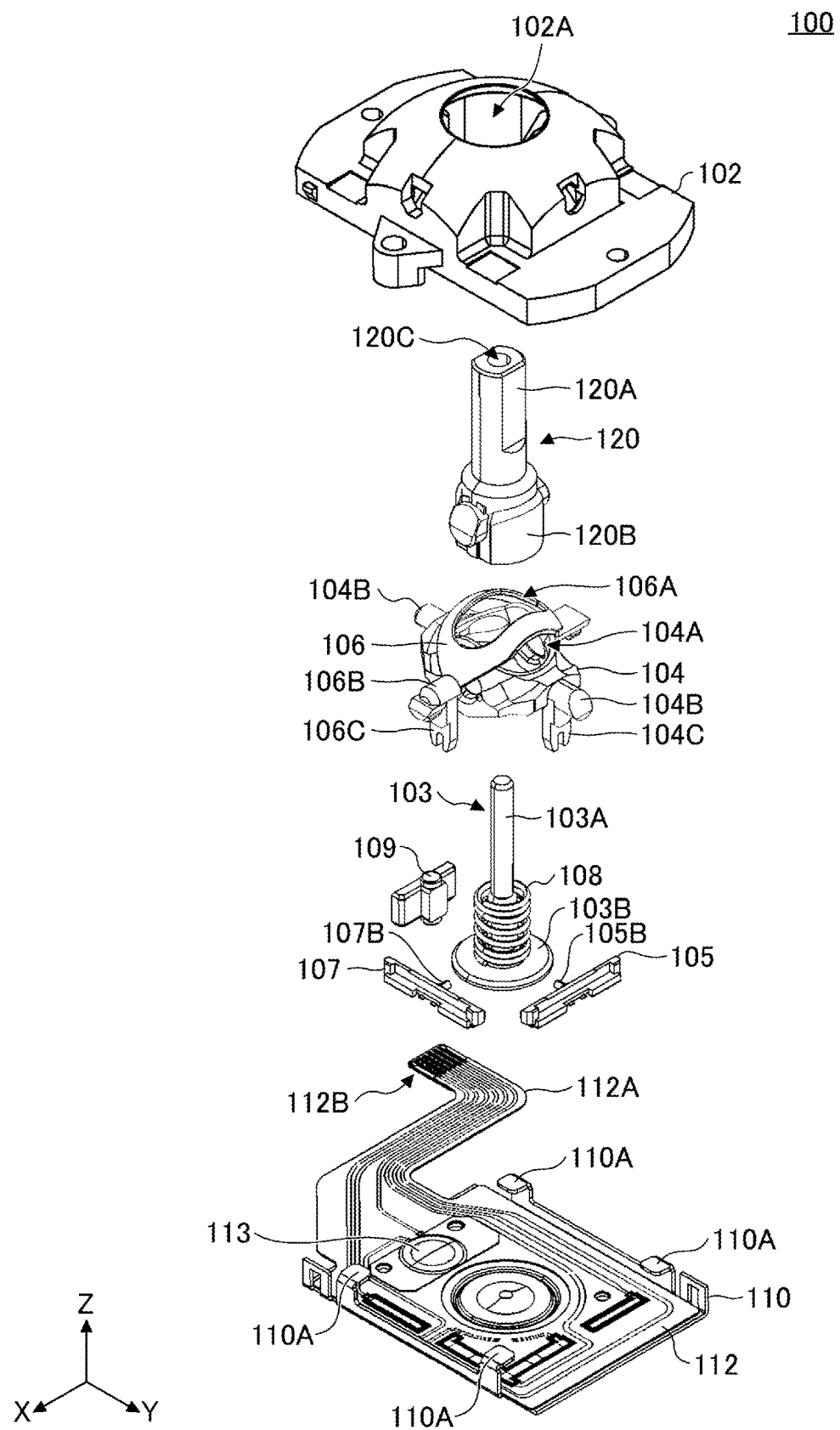
FIG. 3 is an exploded perspective view of the operating device according to one embodiment.
Figure 4:
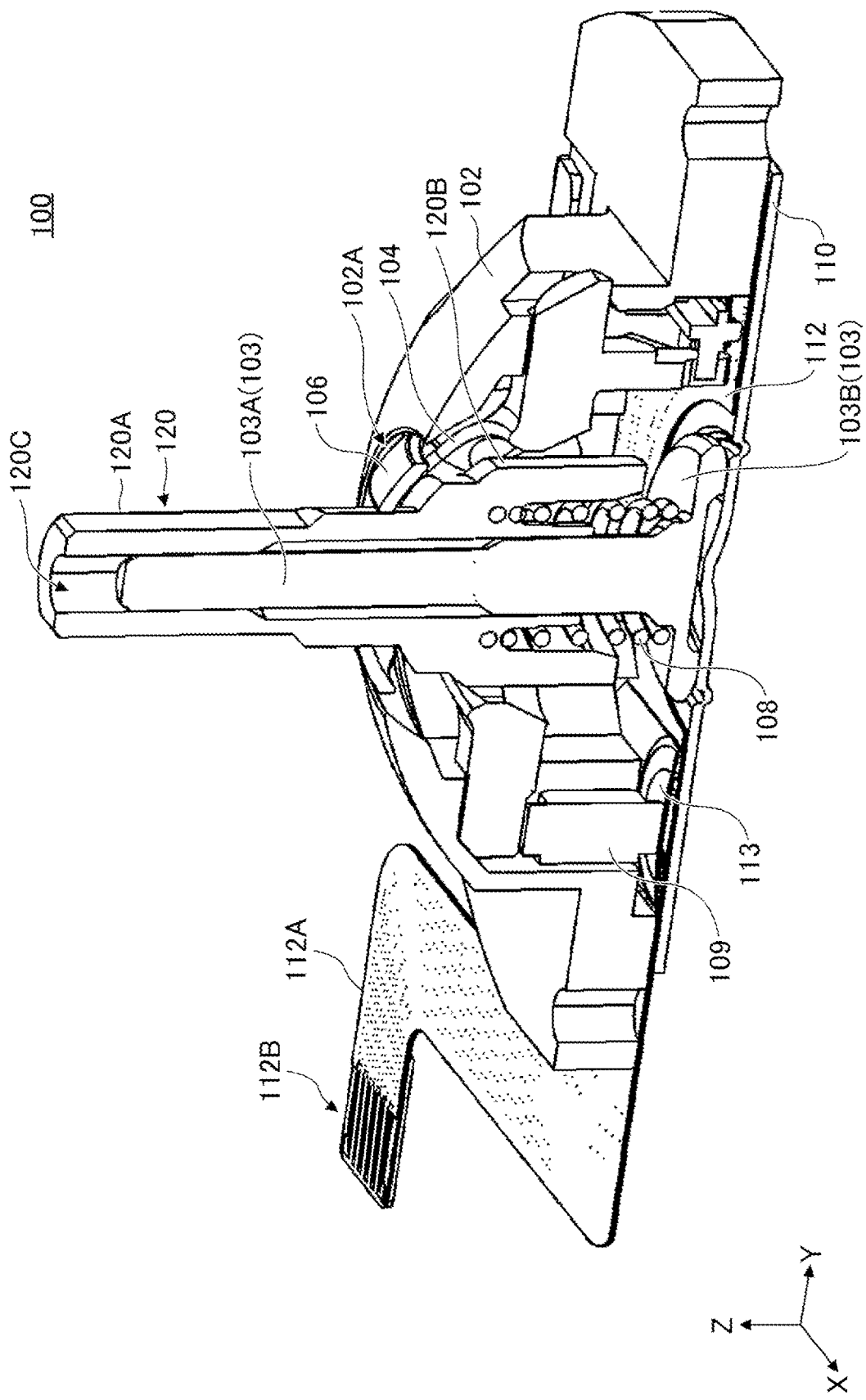
FIG. 4 is a cross-sectional view of the operating device according to one embodiment.

FIG. 2 is an external perspective view of the operating device 100 (with the case 102 removed) according to one embodiment. FIG. 3 is an exploded perspective view of the operating device 100 according to one embodiment. FIG. 4 is a cross-sectional view of the operating device 100 according to one embodiment.

As shown in FIG. 2 to FIG. 4, the operating device 100 includes a case 102, a lever 120, an actuator 104, a holder 105, an actuator 106, an actuator 103, a spring 108, a holder 107, a pressing member 109, a frame 110, an FPC 112, and a metal sheet 113.

The case 102 has a dome-like shape that is upwardly convex. The case 102 incorporates each component (the lever 120, the actuators 103, 104, and 106, and the holders 105 and 107) in its inner space. An opening portion 102A, circular in plan view from above, is formed at the top of the dome-like portion of the case 102.

The lever 120 is a member that is tilted and operated by the operator. The lever 120 has a lever portion 120A and a base portion 120B. The lever portion 120A is a substantially columnar portion that extends upward from the opening portion 102A of the case 102, and is the portion to be tilted and operated by the operator. The base portion 120B is a substantially columnar portion that supports the lower end portion of the lever portion 120A inside the case 102, and rotates in accordance with the tilting operation of the lever portion 120A.

The actuator 104 has a curved dome-like shape, is upwardly convex, and has an opening portion 104A, shaped as an elongated hole and extending in the left-right direction (the Y-axis direction in the drawing) along the curved shape. The actuator 104 has a rotating shaft 104B that sticks out from both the left and right ends of the actuator 104. The rotating shaft 104B is supported by the case 102, so that the actuator 104 can rotate about the rotating shaft 104B in the front-rear direction (the X-axis direction in the drawing).

The actuator 106 is provided on top of the actuator 104. The actuator 106 has a curved shape that is upwardly convex, and has an opening portion 106A, shaped as an elongated hole and extending in the front-rear direction (the X-axis direction in the drawing) along the curved shape. The actuator 106 has a rotating shaft 106B that sticks out from both the front and rear ends of the actuator 106. The rotating shaft 106B is supported by the case 102, so that the actuator 106 can rotate about the rotating shaft 106B in the left-right direction (the Y-axis direction in the drawing).

The holder 105 holds a slider 105A below. The holder 105 has a long and narrow shape that extends in the sliding direction (X-axis direction) of the slider 105A. The holder 105 is provided so as to slide in the sliding direction (X-axis direction) of the slider 105A. A protrusion 105B is provided at the center of a side surface of the holder 105.

The holder 107 holds a slider 107A below. The holder 107 has a long and narrow shape that extends in the sliding direction (Y-axis direction) of the slider 107A. The holder 107 is provided so as to slide in the sliding direction (Y-axis direction) of the slider 107A. A protrusion 107B is provided at the center of a side surface of the holder 107.

As shown in FIG. 2 to FIG. 4, the actuator 104 and the actuator 106 overlap each other such that the opening portion 104A and the opening 106A intersect each other. While the actuator 104 and the actuator 106 overlap each other and the lever portion 120A of the lever 120 penetrates through the openings 104A and 106A, the actuator 104 and the actuator 106 are combined with the base portion 120B of the lever 120, and incorporated in the case 102 with the base portion 120B.

The actuator 104 has an engaging portion 104C protruding downward from the rotating shaft 104B that is situated on the positive Y-axis side. The engaging portion 104C engages with the projection 105B provided at the center of a side surface of the holder 105, which is provided so as to slide on the FPC 112 in the front-rear direction (X-axis direction). When the lever 120 is tilted and operated in the front-rear direction (X-axis direction), the actuator 104 rotates in the front-rear direction, together with the base portion 120B of the lever 120, making the holder 105 slide in the front-rear direction. As a result of this, the state of electrical connection between the slider 105A (see FIG. 6A) held below the holder 105 and the resistors 116 and 117 provided in the FPC 112 changes. Operation signals having resistance values in accordance with the tilting operation (the tilting direction and the tilting angle) of the lever 120 in the front-rear direction are output from a connection portion 112B of the FPC 112.

The actuator 106 has an engaging portion 106C protruding downward from the rotating shaft 106B that is situated on the positive side of the X axis. The engaging portion 106C engages with the projection 107B provided at the center of a side surface of the holder 107, which is provided so as to slide on the FPC 112 in the left-rear direction (Y-axis direction). When the lever 120 is tilted and operated in the left-right direction (Y-axis direction), the actuator 106 rotates in the left-right direction, together with the base portion 120B of the lever 120, making the holder 107 slide in the left-right direction. As a result of this, the state of electrical connection between the slider 107A (see FIG. 6A) held below the holder 107 and the resistors 115 and 117 provided in the FPC 112 changes. Operation signals having resistance values in accordance with the tilting operation (the tilting direction and the tilting angle) of the lever 120 in the left-right direction are output from the connection portion 112B of the FPC 112.

The actuator 103 has a shaft portion 103A and a bottom plate portion 103B. The shaft portion 103A is a round, bar-like portion that is inserted and arranged in a through hole 120C of the lever 120. The bottom plate portion 103B is a disk-like portion that is integrally provided in the lower end portion of the shaft portion 103A.

With the shaft portion 103A of the actuator 103 inserted, the spring 108 is incorporated, together with the actuator 103, in an opening on the bottom side (negative Z-axis side) of the lever 120 (see FIG. 4). The spring 108 preloads the lever 120 upward and preloads the bottom plate portion 103B of the actuator 103 downward. By this means, when the operator quits tilting/operating the lever 120, the spring 108 presses the bottom plate portion 103B of the actuator 103 against the upper surface and the center portion of the frame 110, and brings the bottom plate portion 103B into a horizontal state, thereby allowing the lever 120 to return to its neutral position.

When the lever 120 is pushed downward, the pressing member 109 is pushed downward by the rotating shaft 104B situated on the negative Y-axis side of the actuator 104. By pressing the metal sheet 113 provided on the FPC 112 downward and deforming the metal sheet 113 elastically, the switch circuit formed on the FPC 112 is brought into a conductive state. As a result of this, the FPC 112 outputs a switch-on signal indicating that the lever 120 has been pushed downward.

The frame 110 is a flat metal member that closes the opening on the bottom side of the case 102. For example, the frame 110 is formed by subjecting a metal plate to various processing methods (for example, punching, bending, etc.). The frame 110 is provided with a pair of claw portions 110A on both the front edge portion (positive X-axis side) and the rear edge portion (negative X-axis side). The frame 110 is fixedly coupled to the case 102 as the claw portions 110A engage with the edge portions of the case 102.

The FPC 112 is an example of a "substrate," and is a flexible, film-like wiring member. The FPC 112 has an extension portion 112A that extends from the upper surface of the frame 110 to the side of the frame 110 (in the negative Y-axis direction, in the drawings), and is connected to the outside via the connection portion 112B provided at the tip of the extension portion 112A. The FPC 112 transmits to the outside operation signals in accordance with the operation (tilting operation and pressing operation) of the lever 120. The FPC 112 is formed by covering both surfaces of strip-shaped conductor wires (for example, copper foil) with a flexible and insulating film-like material (for example, polyimide resin, polyethylene terephthalate (PET), etc.).

(Configuration of FPC 112)

Figure 5:
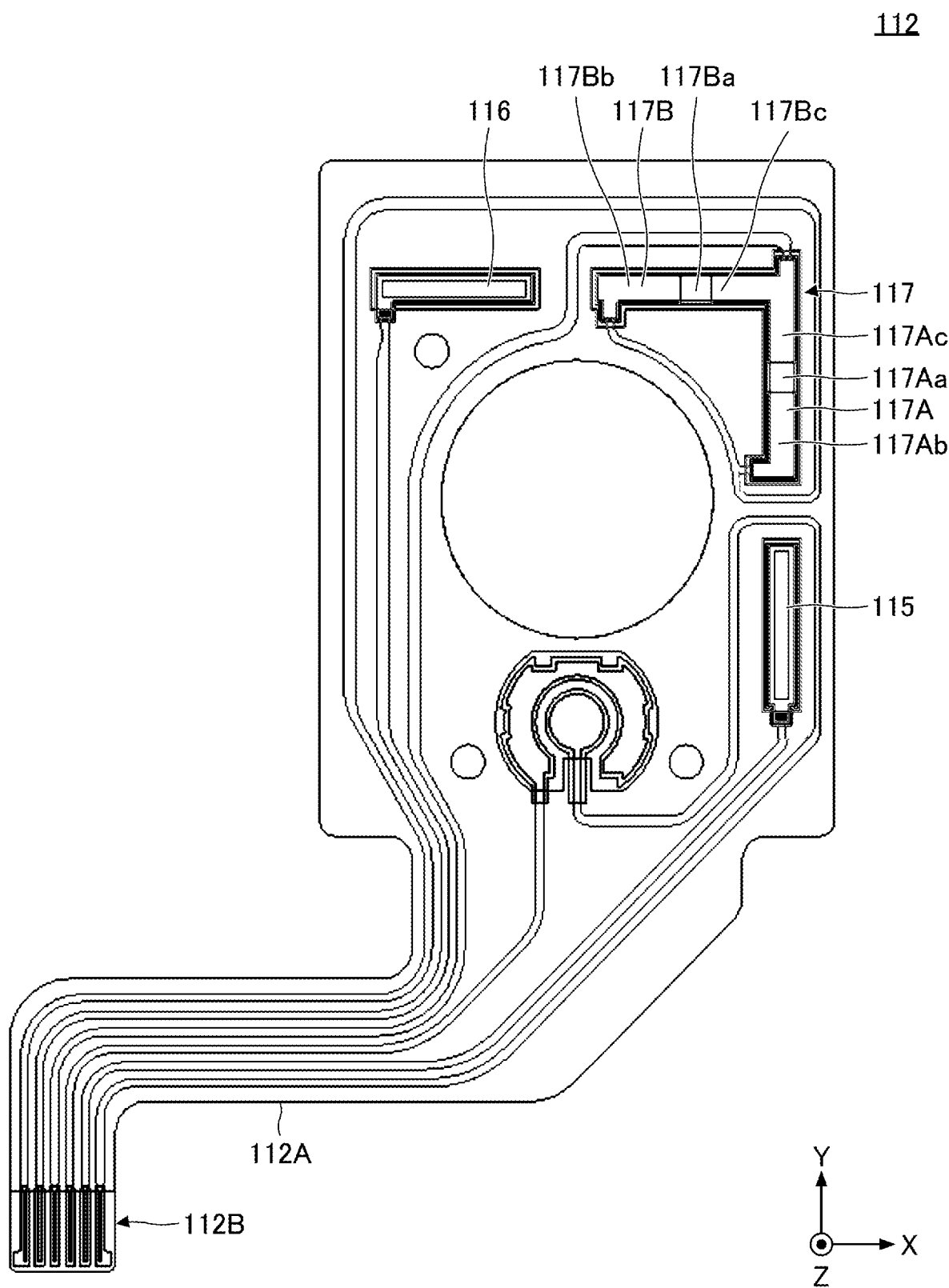
FIG. 5 is a plan view of an FPC included in the operating device according to one embodiment.

FIG. 5 is a plan view of the FPC 112 included in the operating device 100 according to one embodiment. As shown in FIG. 5, the surface of the FPC 112 is provided with a resistor 115, a resistor 116, and a resistor 117, all of which are flat and strip-shaped. For example, each of the resistors 115, 116, and 117 is formed by printing a thin film by using a carbon fiber material.

The resistor 115 is provided near the edge portion of the FPC 112 on the positive X-axis side. The resistor 115 has a strip shape that extends linearly in the Y-axis direction.

The resistor 116 is provided near the edge portion of the FPC 112 on the positive Y-axis side. The resistor 116 has a strip shape that extends linearly in the X-axis direction.

The resistor 117 is provided near the corner portion between the positive X-axis side and the positive Y-axis side in the FPC 112. The resistor 117 is shaped like the letter L, composed of a linear portion 117A and a linear portion 117B. The linear portion 117A has a strip shape that extends linearly in the Y-axis direction. The linear portion 117B has a strip shape that extends linearly in the X-axis direction.

(Contact State of Sliders 105A and 107A)

Figure 6A:
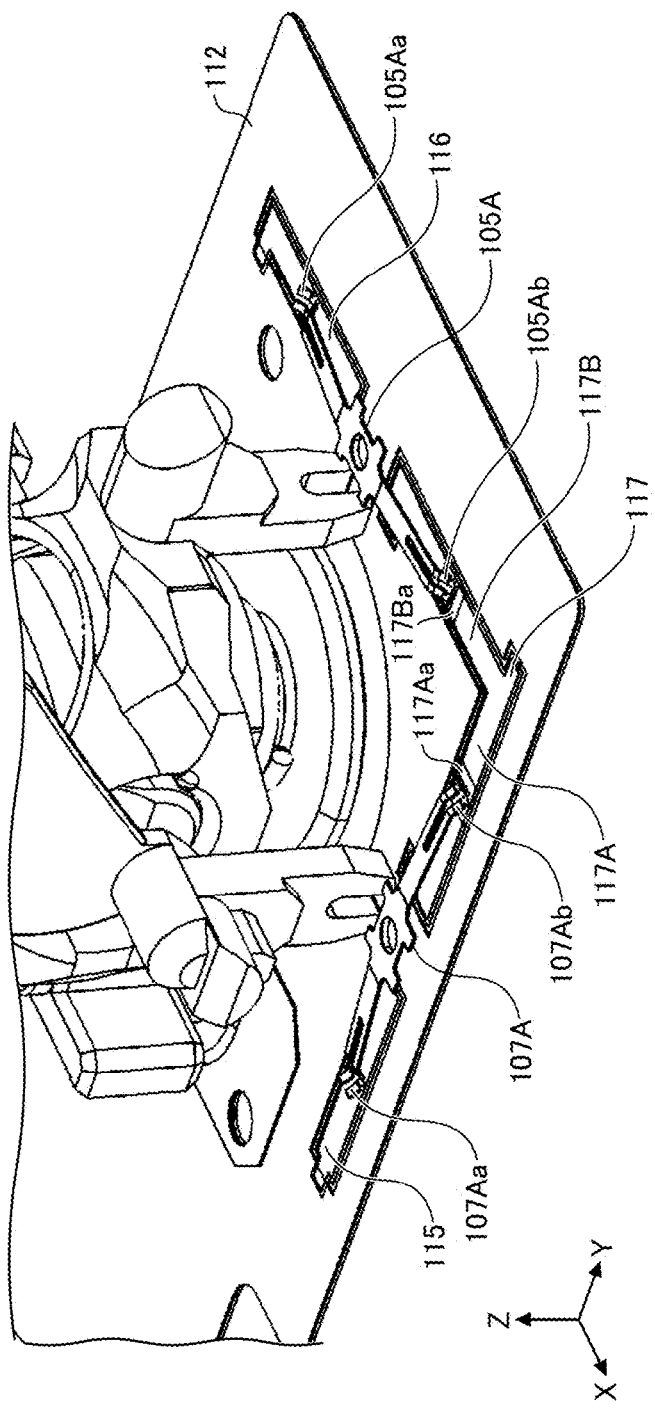
FIG. 6A is a diagram showing a contact state of a slider included in the operating device according to one embodiment and FIG. 6B is a schematic diagram showing a thickness of a resistor included in the operating device according to one embodiment.

FIG. 6A is a diagram showing contact states of the sliders 105A and 107A included in the operating device 100 according to one embodiment.

As shown in FIG. 6A, on the surface of the FPC 112, the linear portion 117A of the resistor 117 and the resistor 115 are spaced apart from each other and arranged linearly in the Y-axis direction. A metal leaf spring-like slider 107A, held below the holder 107, slides in the Y-axis direction on the surfaces of the linear portion 117A and the resistor 115. To be more specific, a contact portion 107Aa, provided at the end portion of the slider 107A on the negative Y-axis side, slides on the surface of the resistor 115. Also, a contact portion 107Ab, provided at the end portion of the slider 107A on the positive Y-axis side, slides on the surface of the linear portion 117A.

Also, as shown in FIG. 6A, on the surface of the FPC 112, the linear portion 117B of the resistor 117 and the resistor 116 are spaced apart from each other and arranged linearly in the X-axis direction. A metal leaf spring-like slider 105A, held below the holder 105, slides in the X-axis direction on the surfaces of the linear portion 117B and the resistor 116. To be more specific, the contact portion 105Aa, provided at the end portion of the slider 105A on the negative X-axis side, slides on the surface of the resistor 116. Also, a contact portion 105Ab, provided at the end portion of the slider 105A on the positive X-axis side, slides on the surface of the linear portion 117B.

With this configuration, in the operating device 100 according to one embodiment, the slider 107A slides in the Y-axis direction on the surfaces of the linear portion 117A and the resistor 115 in accordance with the tilting operation of the lever 120 in the Y-axis direction. As a result of this, the resistance value between the terminal connected to the resistor 117 and the terminal connected to the resistor 115 changes in accordance with the amount of movement of the slider 107A (that is, the tilting angle of the lever 120). External devices can detect the tilting operation and the tilting angle of the lever 120 in the Y-axis direction based on changes in the resistance value between these two terminals.

With this configuration, in the operating device 100 according to one embodiment, the slider 105A slides in the X-axis direction on the surfaces of the linear portion 117B and the resistor 116 in accordance with the tilting operation of the lever 120 in the X-axis direction. As a result of this, the resistance value between the terminal connected to the resistor 117 and the terminal connected to the resistor 116 changes in accordance with the amount of movement of the slider 105A (that is, the tilting angle of the lever 120). External devices can detect the tilting operation and the tilting angle of the lever 120 in the X-axis direction based on changes in the resistance value between these two terminals.

Figure 6B:
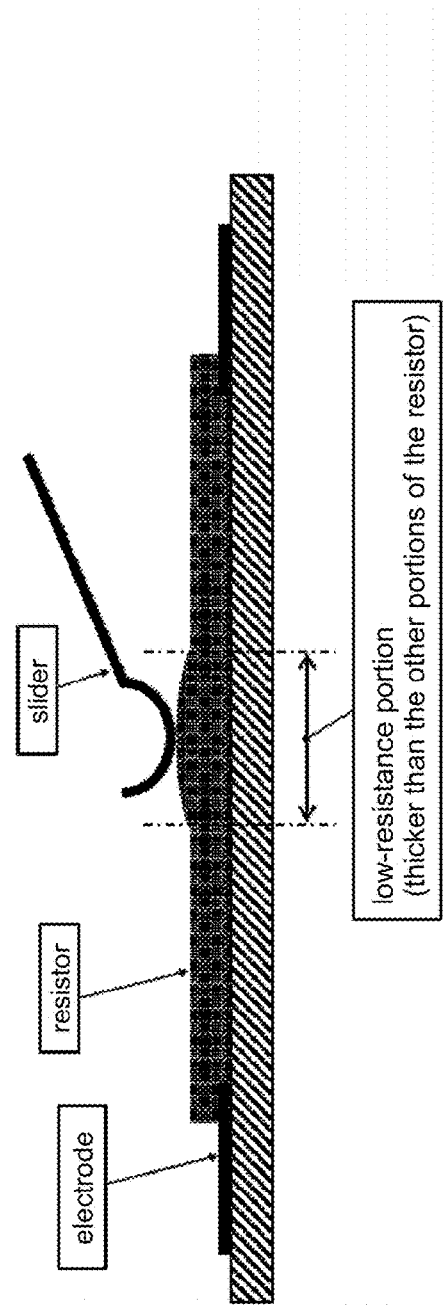

As shown in FIG. 5 and FIG. 6A, the linear portion 117A of the resistor 117 has a low-resistance portion 117Aa. The low-resistance portion 117Aa has a lower resistance value than the other portions 117Ab, 117Ac of the linear portion 117A. Also, as shown in FIG. 5 and FIG. 6A, the low-resistance portion 117Aa is a portion that is in contact with the contact portion 107Ab of the slider 107A when the lever 120 is in the neutral position. With the present embodiment, the low-resistance portion 117Aa is greater in number of laminates of the resistor 117 (that is, greater in thickness as shown in FIG. 6B) than the other portions of the linear portion 117A, and thus has a lower resistance value than the other portions of the linear portion 117A. For example, in the examples shown in FIG. 5 and FIG. 6A, the resistor 117 is two-layered in the low-resistance portion 117Aa, but is single-layered in the other portions of the linear portion 117A. To be more specific, in the low-resistance portion 117Aa, a resistor covering only the low-resistance portion 117Aa in the linear portion 117A and a resistor covering the entirety of the linear portion 117A overlap, thus making the resistor 117 two-layered. As a result of this, in the example shown in FIG. 5, FIG. 6A and FIG. 6B, the resistance value of the low-resistance portion 117Aa is half the resistance value of the other portions of the linear portion 117A.

As shown in FIG. 5 and FIG. 6A, the linear portion 117B of the resistor 117 has a low-resistance portion 117Ba. The low-resistance portion 117Ba has a lower resistance value than the other portions 117Bb, 117Bc of the linear portion 117B. Also, as shown in FIG. 5 and FIG. 6A, the low-resistance portion 117Ba is a portion that is in contact with the contact portion 105Ab of the slider 105A when the lever 120 is in the neutral position. With the present embodiment, the low-resistance portion 117Ba is greater in number of laminates of the resistor 117 (that is, greater in thickness as shown in FIG. 6B) than the other portions of the linear portion 117B, and thus has a lower resistance value than the other portions of the linear portion 117B. For example, in the examples shown in FIG. 5 and FIG. 6A, the resistor 117 is two-layered in the low-resistance portion 117Ba, but is single-layered in the other portions of the linear portion 117B. To be more specific, in the low-resistance portion 117Ba, a resistor covering only the low-resistance portion 117Ba in the linear portion 117B and a resistor covering the entirety of the linear portion 117B overlap, thus making the resistor 117 two-layered. As a result of this, in the example shown in FIG. 5, FIG. 6A and FIG. 6B, the resistance value of the low-resistance portion 117Ba is half the resistance value of the other portions of the linear portion 117B.

(Output Characteristics)

Figure 9:
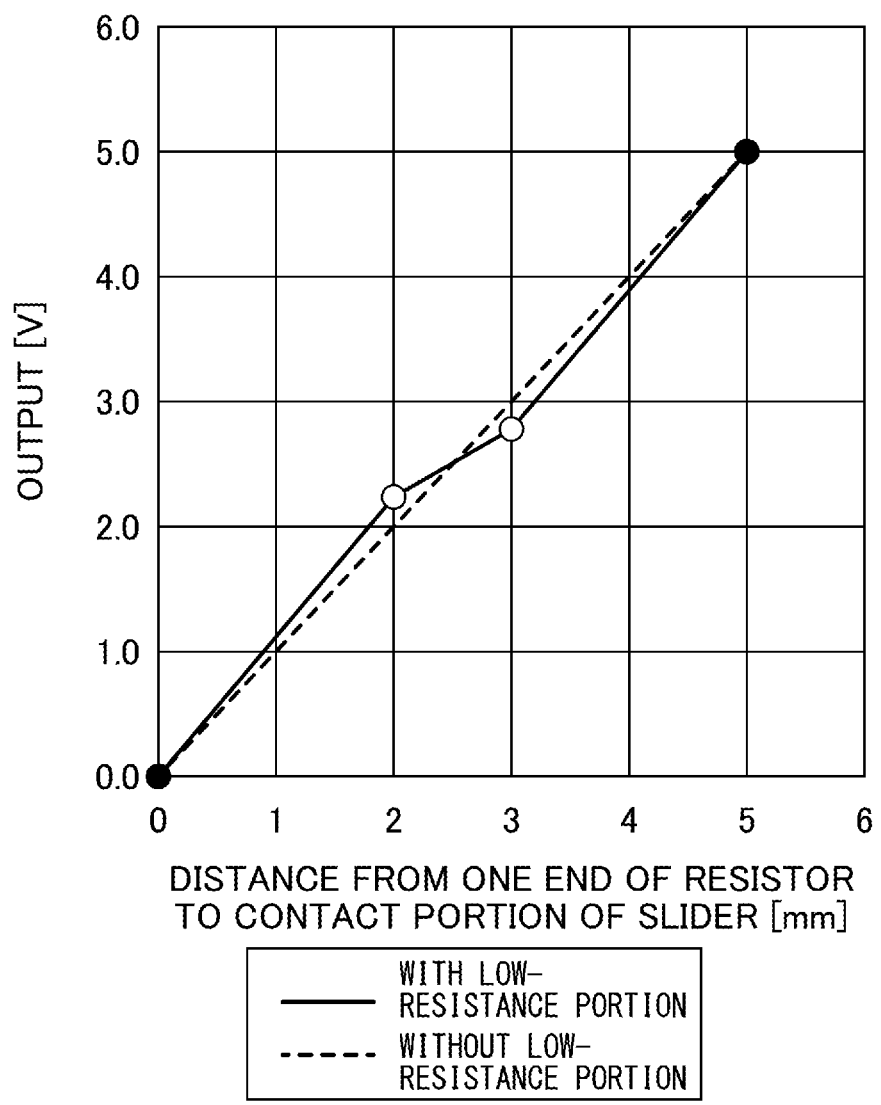
FIG. 9 is a diagram showing the output characteristics of the operating device according to one embodiment.

FIG. 9 is a diagram showing the output characteristics of the operating device 100 according to one embodiment. The graph shown in FIG. 9 shows the relationship between output voltage values and the distance from one end of the resistor 117 (the linear portions 117A and 117B) to the contact portions of the sliders. Note that, in the example shown in FIG. 7, the maximum length of the resistor 117 is "5 mm," and the length of the resistor 117 when the lever 120 is in the neutral position is "2.5 mm." Also, the length of the low-resistance portions 117Aa and 117Ba is set to "1.0 mm." Also, the resistance value of the low-resistance portions 117Aa and 117Ba is half the resistance value of the other portions of the linear portions 117A and 117B. Note that, in FIG. 9, the solid line represents the output voltage when the low-resistance portions 117Aa and 117Ba are provided, and the dashed line represents the output voltage when the low-resistance portions 117Aa and 117Ba are not provided, to illustrate a comparative example.

As shown by the dashed line in FIG. 9, when the low-resistance portions 117Aa and 117Ba are not provided in the linear portions 117A and 117B, the slope of output voltage values is constant in the entirety of the linear portions 117A and 117B.

On the other hand, as shown by the solid line in FIG. 9, when the low-resistance portions 117Aa and 117Ba are provided in the linear portions 117A and 117B, the slope is constant in the other portions of the linear portions 117A and 117B, but the slope of output voltage values is gentler in the low-resistance portions 117Aa and 117Ba than in the other portions.

As a result of this, as shown in FIG. 9, in a range of 1.0 mm centered around the time when the lever 120 is in the neutral position, when the low-resistance portions 117Aa and 117Ba are not provided, the range width of output voltage values is "1.0 V." On the other hand, when the low-resistance portions 117Aa and 117Ba are provided, the range width of output voltage values is "0.5 V" (that is, half of when the low-resistance portions 117Aa and 117Ba are not provided).

The operating device 100 according to one embodiment can thus lower the resistance value of the low-resistance portions 117Aa and 117Ba, so as to moderate the slope of output voltage values near the neutral position of the lever 120, and narrow the range width of output voltage values near the neutral position of the lever 120. By this means, even when the lever 120 physically fails to return to its neutral position, the operating device 100 according to one embodiment can bring the output voltage values closer to a predetermined output voltage value corresponding to the neutral position of the lever 120. Therefore, the operating device 100 according to one embodiment can increase the accuracy of return of the lever 120 to its neutral position in the output voltage values output by the operating device 100, without relying on signal processing.

Note that, regarding the low-resistance portions 117Aa and 117Ba, a resistor to cover the entire range of the linear portions 117A and 117B may be superimposed on the resistor that covers only the low-resistance portions 117Aa and 117Ba in the linear portions 117A and 117B. This can prevent the sliders 107A and 105A from getting caught or hooked at the boundaries between the low-resistance portions 117Aa and 117Ba and the other portions.

Modified Example (Configuration of FPC 112-2)

Figure 7:
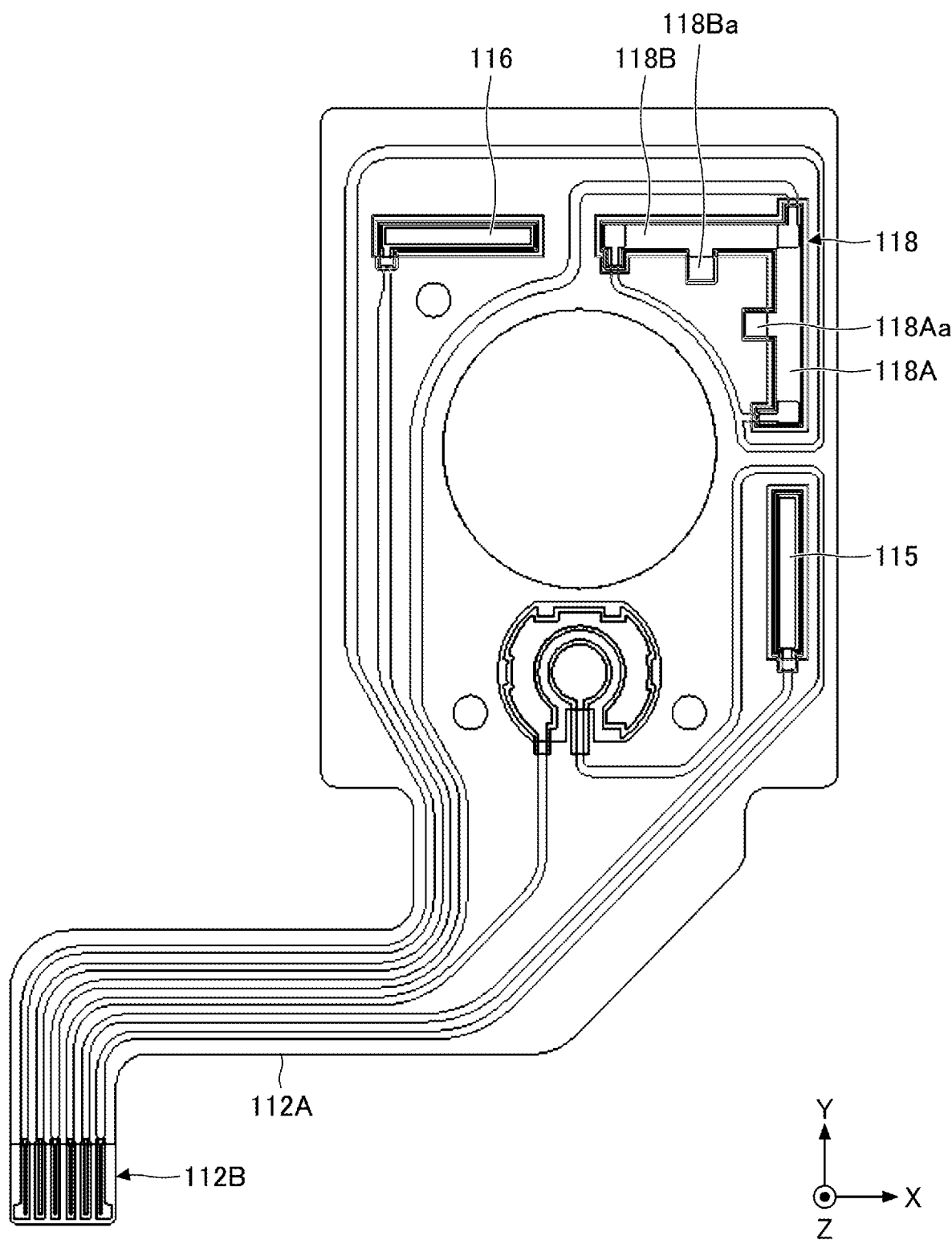
FIG. 7 is a plan view of an FPC included in an operating device according to one modified example.

FIG. 7 is a plan view of an FPC 112-2 included in the operating device 100 according to one modified example. The FPC 112-2 shown in FIG. 7 is a modified example of the FPC 112 shown in FIG. 5. As shown in FIG. 7, the FPC 112-2 is different from the FPC 112 shown in FIG. 5 in that it includes a resistor 118 instead of the resistor 117.

The resistor 118 is formed by printing a thin film by using a carbon fiber material, for example. The resistor 118 is provided near the corner between the positive X-axis side and the positive Y-axis side in the FPC 112-2. The resistor 118 has an L-shape consisting of a linear portion 118A and a linear portion 118B. The linear portion 118A has a strip shape that extends linearly in the Y-axis direction. The linear portion 118B has a strip shape that extends linearly in the X-axis direction.

(Contact State of Sliders 105A and 107A)

Figure 8:
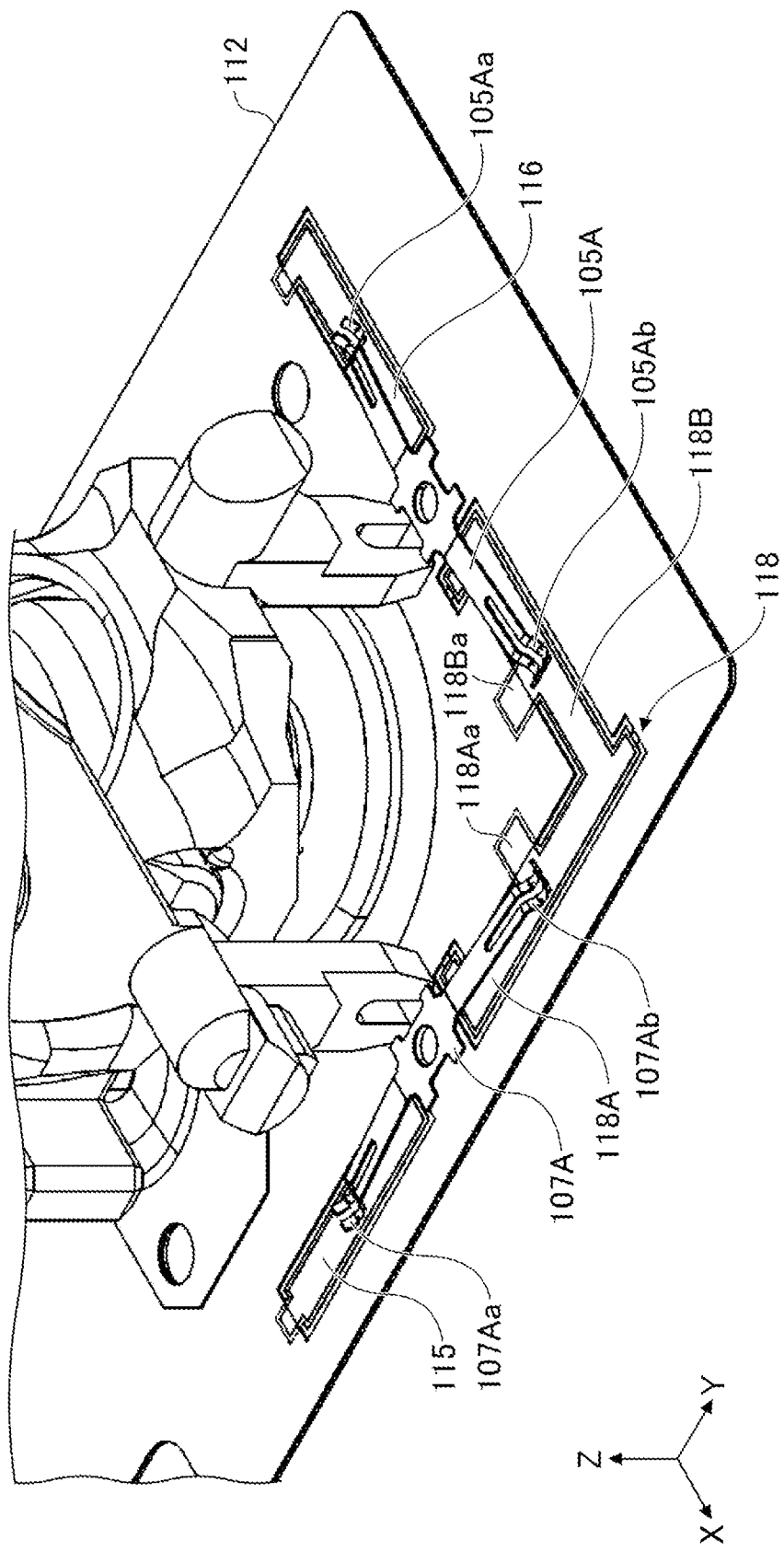
FIG. 8 is a diagram showing a contact state of a slider included in the operating device according to one modified example.

FIG. 8 is a diagram showing contact states of sliders 105A and 107A provided in the operating device 100 according to one modified example.

As shown in FIG. 8, on the surface of the FPC 112-2, the linear portion 118A of the resistor 118 and the resistor 115 are spaced apart from each other, and arranged linearly in the Y-axis direction. A metal leaf spring-like slider 107A, held below the holder 107, slides in the Y-axis direction on the surfaces of the linear portion 118A and the resistor 115. To be more specific, the contact portion 107Aa, provided at the end portion of the slider 107A on the negative Y-axis side, slides on the surface of the resistor 115. Also, the contact portion 107Ab, provided at the end portion of the slider 107A on the positive Y-axis side, slides on the surface of the linear portion 118A.

As shown in FIG. 8, on the surface of the FPC 112-2, the linear portion 118B of the resistor 118 and the resistor 116 are spaced apart from each other, and arranged linearly in the X-axis direction. A metal leaf spring-like slider 105A, held below the holder 105, slides in the X-axis direction on the surfaces of the linear portion 118B and the resistor 116. To be more specific, the contact portion 105Aa, provided at the end portion of the slider 105A on the negative X-axis side, slides on the surface of the resistor 116. Also, a contact portion 105Ab, provided at the end portion of the slider 105A on the positive X-axis side, slides on the surface of the linear portion 118B.

With this configuration, in the operating device 100 according to one modified example, the slider 107A slides in the Y-axis direction on the surfaces of the linear portion 118A and the resistor 115 in accordance with the tilting operation of the lever 120 in the Y-axis direction. By this means, the resistance value between the terminal connected to the resistor 118 and the terminal connected to the resistor 115 changes in accordance with the amount of movement of the slider 107A (that is, the tilting angle of the lever 120). External devices can detect the tilting operation and the tilting angle of the lever 120 in the Y-axis direction based on changes in the resistance value between the two terminals.

With this configuration, in the operating device 100 according to one modified example, the slider 105A slides in the X-axis direction on the surfaces of the linear portion 118B and the resistor 116 in accordance with the tilting operation of the lever 120 in the X-axis direction. By this means, the resistance value between the terminal connected to the resistor 118 and the terminal connected to the resistor 116 changes in accordance with the amount of movement of the slider 105A (that is, the tilting angle of the lever 120). External devices can detect the tilting operation and the tilting angle of the lever 120 in the X-axis direction based on changes in the resistance value between the two terminals.

As shown in FIG. 7 and FIG. 8, in the operating device 100 according to one modified example, the linear portion 118A of the resistor 118 has a low-resistance portion 118Aa. The low-resistance portion 118Aa has a lower resistance value than the other portions of the linear portion 118A. Also, as shown in FIGS. 7 and 8, the low-resistance portion 118Aa is a portion that is in contact with the contact portion 107Ab of the slider 107A when the lever 120 is in its neutral position. In this modified example, the resistance value of the low-resistance portion 118Aa is lower than that of the other portions of the linear portion 118A because the width of the resistor 118 is larger than that of the other portions of the linear portion 118A. For example, in the examples shown in FIG. 7 and FIG. 8, the width of the resistor 118 in the low-resistance portion 118Aa is twice the width of the resistor 118 in the other portions of the linear portion 118A. As a result of this, in the examples shown in FIG. 7 and FIG. 8, the resistance value of the low-resistance portion 118Aa is half the resistance value of the other portions of the linear portion 118A.

As shown in FIG. 7 and FIG. 8, in the operating device 100 according to one modified example, the linear portion 118B of the resistor 118 has a low-resistance portion 118Ba. The low-resistance portion 118Ba has a lower resistance value than the other portions of the linear portion 118B. Also, as shown in FIGS. 7 and 8, the low-resistance portion 118Ba is a portion that is in contact with the contact portion 105Ab of the slider 105A when the lever 120 is in its neutral position. In this modified example, the resistance value of the low-resistance portion 118Ba is lower than that of the other portions of the linear portion 118B because the width of the resistor 118 is larger than that of the other portions of the linear portion 118B. For example, in the examples shown in FIG. 7 and FIG. 8, the width of the resistor 118 in the low-resistance portion 118Ba is twice the width of the resistor 118 in the other portions of the linear portion 118B. As a result of this, in the examples shown in FIG. 7 and FIG. 8, the resistance value of the low-resistance portion 118Ba is half the resistance value of the other portions of the linear portion 118B.

Also, in the operating device 100 according to one modified example, output characteristics that are similar to those shown in FIG. 9 can be obtained by lowering the resistance value of the low-resistance portions 118Aa and 118Ba. That is, the operating device 100 according to one modified example can moderate the slope of output voltage values near the neutral position of the lever 120, and narrow the range width of output voltage values near the neutral position of the lever 120. By this means, even when the lever 120 physically fails to return to its neutral position, the operating device 100 according to one embodiment can bring the output voltage values closer to a predetermined output voltage value corresponding to the neutral position of the lever 120. Therefore, the operating device 100 according to one embodiment can increase the accuracy of return of the lever 120 to its neutral position in the output voltage values output by the operating device 100, without relying on signal processing.

Note that the operating device 100 according to one modified example employs a configuration in which the engaging portions 104C and 106C of the actuators 104 and 106 engage with the protrusions 105B and 107B provided at the center portions of the holders 105 and 107, thereby allowing the holders 105 and 107 to slide. Therefore, there is a risk, with the operating device 100 according to one modified example, the holders 105 and 107 might rotate about the central portion due to rattling between the protrusions 105B and 107B and the engaging portions 104C and 106C. In this case, the contact portions 105Ab and 107Ab of the sliders 105A and 107A might rotate in the width direction of the resistor 118. However, in the operating device 100 according to one modified example, the width of the resistor 118 in the low-resistance portions 118Aa and 118Ba is widened, so that, even when the contact portions 105Ab and 107Ab of the sliders 105A and 107A rotate in the width direction of the resistor 118, it is possible to prevent the contact portions 105Ab and 107Ab of the sliders 105A and 107A from deviating from the resistor 118.

Although an embodiment of the present invention has been described in detail above, the present invention is not limited to this embodiment, and a variety of alterations or changes can be made.

For example, the low-resistance portion may be configured such that its resistance value decreases gradually from other portions. For example, the low-resistance portion may be configured such that the thickness of the resistor gradually increases from other portions, so that its resistance value decreases gradually from other portions. Furthermore, for example, the low-resistance portion may be configured such that the width of the resistor gradually increases from other portions, so that its resistance value decreases gradually from other portions.

The invention claimed is:
1. An operating device comprising:
   a lever configured to be operated by tilting;
   a resistor having a flat strip shape extending in an extending direction and provided on a surface of a substrate; and
   a slider configured to change a contact position along the extending direction of the resistor on a surface of the resistor by sliding on the surface of the resistor in accordance with tilting operation of the lever,
   wherein the resistor has a low-resistance portion that has a lower resistance value than other portions of the resistor because the low-resistance portion is thicker than the other portions of the resistor, the low-resistance portion in contact with the slider when the lever is in a neutral position.
2. The operating device according to claim 1,
   wherein the slider has an elongated shape that extends in a sliding direction of the slider, and
   wherein the operating device further comprises:

a holder having an elongated shape that extends in the sliding direction of the slider and holding the slider below; and an actuator having an engaging portion that engages with a central portion of the holder in the sliding direction of the slider, and configured to slide the holder in the sliding direction of the slider in accordance with the tilting operation of the lever.

3. An operating device comprising:

a lever configured to be operated by tilting:

a resistor having a flat strip shape extending in an extending direction and provided on a surface of a substrate; and a slider configured to change a contact position along the extending direction of the resistor on a surface of the resistor by sliding on the surface of the resistor in accordance with tilting operation of the lever, wherein the resistor has a low-resistance portion that has a lower resistance value than other portions of the resistor because the low-resistance portion is wider than the other portions of the resistor, the low-resistance portion in contact with the slider when the lever is in a neutral position.

* * * * *